United States Patent [19]
Morita

[11] Patent Number: 5,145,262
[45] Date of Patent: Sep. 8, 1992

[54] COMPACT BALL SPLINE BEARING ASSEMBLY

[75] Inventor: Kunihiko Morita, Koganei, Japan

[73] Assignee: Nippon Thompson Co., Ltd., Japan

[21] Appl. No.: 709,536

[22] Filed: Jun. 3, 1991

[30] Foreign Application Priority Data
Jun. 4, 1990 [JP] Japan ............... 2-58419[U]

[51] Int. Cl.⁵ ............ F16C 29/04; F16C 21/00
[52] U.S. Cl. ............ 384/49; 384/25; 384/101
[58] Field of Search ........... 384/7, 10, 12, 13, 25; 384/40, 49, 101, 102

[56] References Cited

U.S. PATENT DOCUMENTS

| | | | |
|---|---|---|---|
| 2,595,482 | 5/1952 | Palumbo | 384/49 |
| 3,503,269 | 3/1970 | O'Connor | 384/101 X |
| 4,280,341 | 7/1981 | Krude | 384/49 X |
| 4,433,875 | 2/1984 | Walter et al. | 384/49 |
| 4,437,782 | 3/1984 | Geisthoff | 384/49 X |

FOREIGN PATENT DOCUMENTS

| | | | |
|---|---|---|---|
| 1288368 | 1/1969 | Fed. Rep. of Germany | 384/101 |
| 678206 | 8/1979 | U.S.S.R. | 384/101 |
| 946200 | 1/1964 | United Kingdom | 384/101 |
| 1435948 | 5/1976 | United Kingdom | 384/101 |

Primary Examiner—Thomas R. Hannon
Attorney, Agent, or Firm—Skjerven, Morrill, MacPherson, Franklin & Friel

[57] ABSTRACT

A ball spline bearing assembly includes a spline shaft having a peripheral surface formed with a spline groove, an outer sleeve fitted onto the spline shaft with a predetermined gap therebetween and a plurality of balls interposed between the spline shaft and the outer sleeve. A ball holder is provided in a radial hole formed in the outer sleeve and a ball is rotatably held in position and in engagement with the spline groove by the ball holder. A fluid line is formed in the outer sleeve and the ball holder so that a pressurized fluid may be supplied to establish a fluidic cushion between the ball holder and the ball. Also provided is a plurality of solid lubricants which are normaly pressed against the spiral groove to keep the groove lubricated at all times.

12 Claims, 1 Drawing Sheet

COMPACT BALL SPLINE BEARING ASSEMBLY

BACKGROUND OF THE INVENTION

1. Field of the Invention

This invention generally relates to a ball spline bearing assembly, and, in particular, to improvements in such a ball spline bearing assembly.

2. Description of the Prior Art

A ball spline bearing assembly is well known in the art. A typical prior art ball spline bearing assembly includes a spline shaft formed with at least one spline groove at its peripheral surface extending in parallel with the longitudinal axis, an outer sleeve fitted onto the spline shaft with a predetermined gap therebetween and a plurality of balls interposed between the spline shaft and the outer sleeve to provide a rolling contact therebetween. The outer sleeve is typically provided with at least one endless circulating path along which the balls circulate endlessly so that the spline shaft may move relative to the outer sleeve in the longitudinal direction. Such a typical ball spline bearing assembly is useful in many applications; however, it tends to be bulky since an endless circulating path must be formed in the outer sleeve, and, moreover, it tends to be expensive due to difficulty in manufacture. Furthermore, since the balls are physically in rolling contact with both of the spline shaft and the outer sleeve, the resistance between the spline shaft and the outer sleeve is relatively large, which tends to hinder a fine relative positional control between the spline shaft and the outer sleeve.

In a typical prior art ball spline bearing assembly, the distance between the outer surface of the spline shaft and the outer surface of the outer sleeve is required to be set approximately at twice the diameter of the balls used, and, thus, if such a ball spline bearing assembly were to be fabricated compact in size, difficulty would be encountered in manufacture since enough space could not be found easily in designing an endless circulating path. Because of recent expansion of application of robot machines in various fields, there has been a need to develop a ball spline bearing assembly compact in size and high in performance.

One such prior art ball spline bearing assembly is disclosed in the Japanese Utility Model Post-examination Pub. No. 1-39939. In this ball spline bearing assembly, a plurality of threaded radial holes are provided in the outer sleeve arranged longitudinally as well as circumferentially at equal intervals and a ball holder having a substantially spherical concave end at its inner end is threaded into each of the radial holes. And, a ball is rotatably received in the concave end of the ball holder and the ball is partly exposed and received in a corresponding spline groove of the spline shaft. Thus, a rolling contact is provided between the outer sleeve and the spline shaft through the balls, so that there may be provided a relative linear motion between the outer sleeve and the spline shaft.

However, in the prior art ball spline bearing assembly, since it is so structured that lubricant oil is supplied to the balls from an oil groove formed at the outer surface of the outer sleeve through an oil supply hole, there is a difficulty in keeping the spline grooves and the balls lubricated uniformly at all times.

SUMMARY OF THE INVENTION

In accordance with the present invention, there is provided a ball spline bearing assembly including a spline shaft formed with a spline groove extending longitudinally along a peripheral surface thereof, an outer sleeve fitted onto the spline shaft with a predetermined gap therebetween, and a plurality of balls interposed between the spline shaft and the outer sleeve in engagement with the spline groove. The outer sleeve is provided with holding means for holding each of the balls in position so that there may be provided a relative longitudinal movement between the spline shaft and the outer sleeve.

Also provided is a pressurized fluid supplying means for supplying a pressurized fluid to the holding means such that a film of pressurized fluid is formed at least partly between each of the balls and the holding means during operation. In a preferred embodiment, the holding means includes a concave recess for receiving a ball at least partly, and the pressurized fluid supplying means includes a channel leading to a surface of the concave recess. Preferably, air under pressure is used as the pressurized fluid. Such a structure is advantageous since a substantial floating condition is established at least between the balls and the outer sleeve during operation so that the resistance between the spline shaft and the outer sleeve can be significantly reduced. In addition, since no endless circulating path is provided for the balls, the outer sleeve can be made extremely thinner, which contributes to make the entire structure compact in size.

In addition, in accordance with a preferred embodiment of the present invention, at least one solid lubricant is provided in the outer sleeve such that it is normally urged into engagement with the spline groove. Since the balls are always in rolling contact with the spline groove of the spline shaft, it is important to keep the spline groove well lubricated at all times. Although such lubrication can be effected with the use of any ordinary lubricant, in accordance with a preferred embodiment of the present invention, at least one solid lubricant is provided to be normally urged against the spline groove of the spline shaft. Typically, a holding recess is formed in the outer sleeve and a solid lubricant is slidably fitted into such a recess with an urging means, such as a spring, interposed between the bottom of the holding recess and the solid lubricant, which is partly fitted into the spline groove of the spline shaft. With this structure, the spline groove can be maintained well lubricated at all times. Preferably, a plurality of such solid lubricants are provided.

Therefore, it is a primary object of the present invention to provide an improved ball spline bearing assembly.

Another object of the present invention is to provide an improved ball spline bearing assembly compact in size, simple in structure and high in performance.

A further object of the present invention is to provide an improved ball spline bearing assembly extremely low in resistance and high in accuracy.

A still further object of the present invention is to provide an improved ball spline bearing assembly capable of maintaining a well lubricated condition at all times.

Other objects, advantages and novel features of the present invention will become apparent from the following detailed description of the invention when considered in conjunction with the accompanying drawings.

DESCRIPTION OF THE PREFERRED EMBODIMENTS

Figure 1:
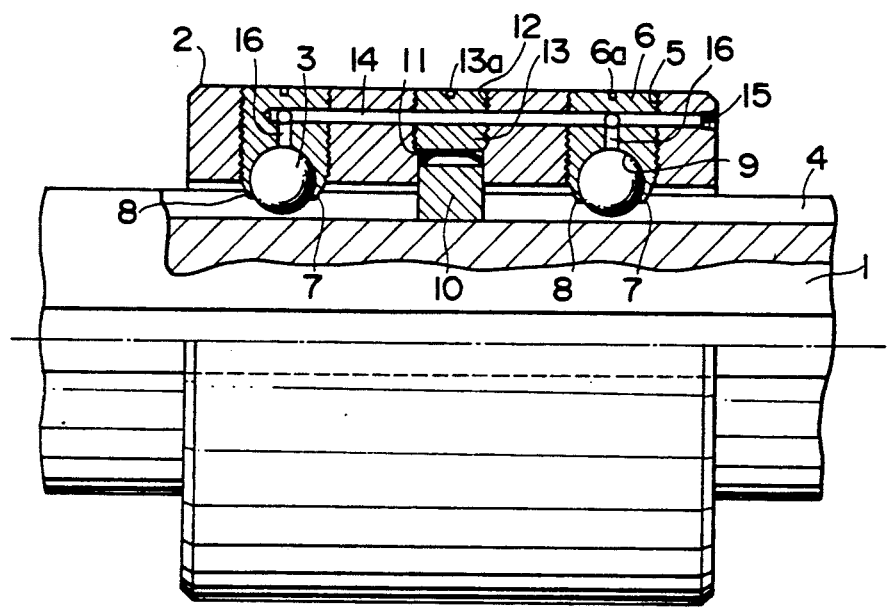
FIG. 1 is a schematic illustration showing partly in longitudinal cross section a ball spline bearing assembly constructed in accordance with one embodiment of the present invention.

Referring first to FIG. 1, there is schematically shown a ball spline bearing assembly constructed in accordance with one embodiment of the present invention. As shown, the present ball spline bearing assembly includes a spline shaft 1 which extends longitudinally and which is formed with a plurality (four in the illustrated embodiment) of spline grooves 4 along its peripheral surface. In the illustrated embodiment, each of the spline grooves 4 has a substantially V-shaped cross section. Also provided in the present ball spline bearing assembly is an outer sleeve 2 which is fitted onto the spline shaft 1 with a predetermined gap therebetween. A plurality of balls 3 are interposed between the spline shaft 1 and the outer sleeve 2. As shown, the balls 3 are held in position by the outer sleeve 2 and engaged in the respective spline grooves 4 of the spline shaft 1.

Figure 2:
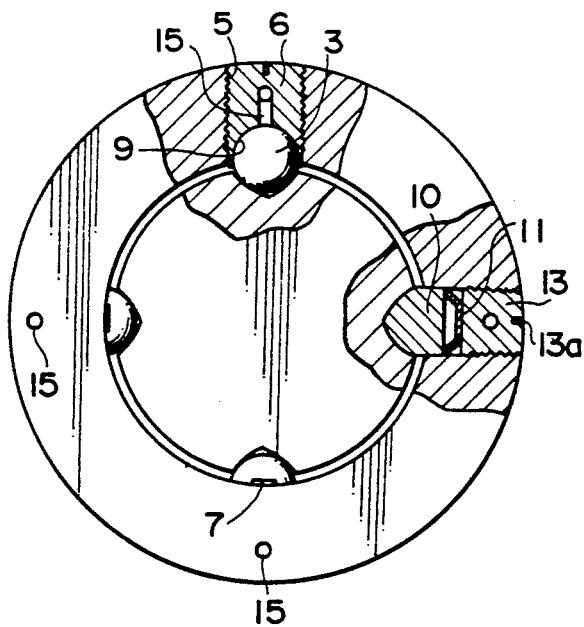
FIG. 2 is a schematic illustration showing a transverse cross section of the ball spline bearing assembly shown in FIG. 1.

In the illustrated embodiment, the balls 3 are spaced apart from each other in the longitudinal direction as well as in the circumferential direction at equal angular intervals. Also provided in the assembly shown in FIG. 1 are solid lubricants 10 located approximately at the center of the outer sleeve 2 in the longitudinal direction in the illustrated embodiment, spaced apart from each other at equal angular intervals in the circumferential direction, and in sliding contact with the spline groove 4. Thus, as shown in FIG. 2, four balls 3 are provided circumferentially at 90° intervals at one longitudinal position. Four solid lubricants 10 are also provided circumferentially at 90° intervals and in engagement with the spline groove 4. Since the balls 3 are rotatably held by the outer sleeve 2 in position, the balls 3 are in rolling contact with the spline groove 4. On the other hand, the solid lubricants 10 are in sliding contact with the spline groove 4 to keep the spline groove 4 lubricated.

Figure 3:
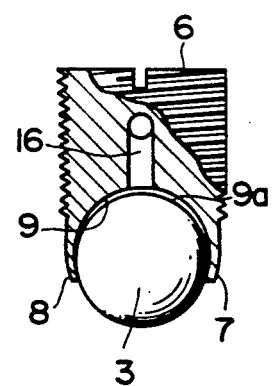
FIG. 3 is a schematic illustration showing an enlarged view of a ball holder provided in the outer sleeve of the ball spline bearing assembly shown in FIG. 1.

The outer sleeve 2 is formed with a plurality of radial holes 5, four at each of two longitudinal locations in the illustrated embodiment. In the illustrated embodiment, the holes 5 extend through the wall of the outer sleeve 2 in the radial direction and they are threaded at least partly. A plurality of ball holders 6 are threaded into the plurality of holes 5, respectively. Each of the ball holders 6 has a concave end 9, which is preferably substantially spherical in shape at its bottom, and, thus, a corresponding ball 3 may be rotatably received in the concave end 9 at least partly. As best shown in FIG. 3, the concave end 9 has a tip end portion 7, 8 which is curved somewhat inwardly so as to embrace the corresponding ball 3 in the space defined by the concave end 9. The diameter of the tip end portion 7, 8 is slightly smaller than the diameter of the ball 3. As a result, the ball 3 may be forced into the space defined by the concave end 9, passing through the mouth defined by the tip end portion 7, 8, and once placed in the space defined by the concave end 9, the ball 3 may be held in that space by the tip end portion 7, 8. Thus, the ball 3 would not fall out of the space defined by the concave end 9 even if the ball holder 6 is oriented as shown in FIG. 3.

The ball holder 6 has an outer or top end which is formed with a slot 6a which may be used to have the ball holder screwed into the corresponding hole 5 using a screw driver or any other tool. In the illustrated embodiment, the ball holders 6 are screwed into the holes 5 until their outer ends are substantially flush with the outer peripheral surface of the outer sleeve 2. However, if desired, the location of each of the ball holders 6 may be set such that a desired rolling contact may be obtained between the balls 3 and the spline groove 4 of the spline shaft 1.

As best shown in FIG. 3, the concave end 9 of ball holder 6 is so shaped that a predetermined gap 9a is defined between the surface of the concave end 9 and the ball 3 held in the space defined by the concave end 9. In the structure shown in FIG. 3, the ball 3 is supported by the tip end portion 7, 8 of the concave end 9. In one embodiment, after placing the ball 3 in the space defined by the concave end 9, the tip end portion 7, 8 can be caulked until the diameter of the tip end portion 7, 8 becomes smaller than the diameter of the ball 3. It should be noted that the ball holding structure should not be limited to the above-described structure, and any appropriate means may be applied as long as the ball 3 may be held in position and placed in rolling contact with the spline groove 4 of the spline shaft 1.

In a plurality of holes 12 which are located in the middle of the outer sleeve 2 in the longitudinal direction and which are threaded at least partly, solid lubricants 10 are provided. With this arrangement, the spline groove 4 can be maintained lubricated uniformly along its entire surface. However, the present invention should not be limited only to such an arrangement, and any other arrangement may also be used, if desired. The structure shown in FIG. 1 having an arrangement of a plurality of balls 3 at each end of the outer sleeve 2 and a plurality of solid lubricants 10 at the center is advantageous in absorbing any rattling motion of the outer sleeve 2 and keeping the spline groove 4 lubricated uniformly at all times.

In the preferred embodiment, the solid lubricant 10 is comprised of $MoS_2$; however, use may also be made of any other solid lubricant materials. As best illustrated in FIG. 2, each of the solid lubricants 10 is slidably fitted into a corresponding hole 12 with its tip end portion sticking out beyond the inner surface of the outer sleeve 2 and thus placed in sliding contact with the spline groove 4. A stopper screw 13 is threaded into a threaded portion of the hole 12 and a spring 11 is placed between the stopper screw 13 and the outer end of the solid lubricant 10. Thus, the solid lubricant 10 is normally urged radially inwardly so that the inner end of the solid lubricant 10 is normally pressed against the spline groove 4. Such a structure is advantageous from an operational point of view since the solid lubricant 10 may be maintained pressed against the spline groove 4 even if wear occurs and thus the spline groove 4 may be maintained properly lubricated at all times. The stopper screw 13 has an outer end which is formed with a slot 13a which may be used for screwing the stopper screw 13 into the corresponding hole 12 using a screw driver or the like. In this manner, the location of the stopper screw 13 in the hole 12 may be suitably adjusted to obtain a desired sliding contact between the solid lubricant 10 and the spline groove 4. In the embodiment shown in FIG. 2, the solid lubricant 10 has an inner end which is generally V-shaped in cross section. However, the tip end shape of the solid lubricant may be varied suitably depending on the cross sectional shape of the spline groove 4. Even if there is a discrepancy in shape between the spline groove 4 and the inner end of the solid lubricant 10, the tip end of solid lubricant 10 will be suitably changed in shape to fit the cross sectional shape of the spline groove 4.

Also provided in the outer sleeve 2 of the present ball spline bearing assembly is a pressurized fluid supply channel 14 which extends in a direction parallel with the longitudinal direction of the spline shaft 1. Such a pressurized fluid supply channel 14 is provided at four circumferential locations corresponding in position to the balls 3 in the outer sleeve 2. Each of the pressurized fluid supply channels 14 has one end blocked and another end 15 opened at one end surface of the outer sleeve 2. The open end 15 may be connected to any pressurized fluid supply system which may include an air compressor. The pressurized fluid supply channel 14 extends through a predetermined number of holes 5. The ball holder 6 is formed with a connection channel 16 which establishes a fluidic connection between the pressurized fluid supply channel 14 and the space defined by the concave end 9. Thus, during operation, pressurized fluid, preferably air, is supplied into the pressurized fluid supply channel 14 through the open end 15 and then into the space defined by the concave end 9 through the connection channel 16 of the ball holder 6. As a result, since pressurized fluid is supplied into the gap 9a between the surface of the concave end 9 and the ball 3, a fluid dynamic cushion is established between the concave end 9 and the ball 3. On the other hand, since the ball 3 tends to be pushed toward the spline groove 4 to establish a rolling contact, the resistance between the outer sleeve and the spline shaft 1 is significantly reduced. In addition, if the tip end portion 7, 8 is so shaped that some of the pressurized fluid thus supplied leak through a small gap between the ball 3 and the tip end portion 7, 8, then such a leaking fluid will be supplied to the spline groove 4 to thereby tend to place the ball 3 in a somewhat floating state. In this case, the resistance between the ball 3 and the spline groove 4 is also reduced. In addition, such a pressurized fluid would help to distribute the lubricant scraped from the solid lubricant 10, whereby the spline groove 4 may be lubricated more uniformly. If desired, any pressure regulating means may be provided in such a pressurized fluid supply system so as to supply pressurized fluid at a regulated pressure.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A ball spline bearing assembly, comprising:
   a spline shaft having a peripheral surface formed with at least one spline groove extending in a longitudinal direction;
   an outer sleeve fitted onto said spline shaft with a predetermined gap therebetween;
   holding means provided in said outer sleeve for holding a plurality of balls in position and in engagement with said spline groove; and
   pressurized fluid supplying means provided in said outer sleeve for supplying pressurized fluid to each of said plurality of balls such that a fluidic cushion is formed between said holding means and each of said plurality of balls at least partly.

2. The assembly of claim 1, wherein said outer sleeve is formed with a first plurality of radial holes and said holding means includes a first plurality of ball holders each of which may be threadably fitted into a corresponding one of said first plurality of radial holes, each of said first plurality of ball holders having an inner end which is substantially concave in shape to receive therein a corresponding ball partly.

3. The assembly of claim 2, wherein said concave inner end has a tip end portion which has a diameter smaller than a diameter of the ball so that the ball is prevented from slipping away.

4. The assembly of claim 3, wherein said tip end portion is caulked after placing the ball in a space defined by said concave inner end.

5. The assembly of claim 3, wherein a space defined by said concave inner end is larger than the ball so that the ball may move inside the space, so that a predetermined gap may be defined between the concave inner end and the ball.

6. The assembly of claim 5, wherein said pressurized fluid supplying means supplies pressurized fluid into said predetermined gap between the concave inner end and the ball to thereby define a fluid dynamic cushion in said gap.

7. The assembly of claim 6, wherein said pressurized fluid supplying means includes at least one first channel extending in said outer sleeve and at least one second channel extending in each of said first plurality of ball holders, said second channel being in fluidic communication with said first channel and also with said predetermined gap between the concave inner end and the ball.

8. The assembly of claim 2, wherein each of said first plurality of ball holders has an outer end formed with a slot.

9. The assembly of claim 1, further comprising a plurality of solid lubricants which are normally pressed against said spline groove.

10. The assembly of claim 9, wherein said outer sleeve is formed with a second plurality of radial holes for slidably holding therein said plurality of solid lubricants, respectively.

11. The assembly of claim 10, wherein stopper screws are threaded into corresponding ones of said second plurality of radial holes and a spring is placed between each of said plurality of solid lubricants and said stopper screws so as to keep each of said plurality of solid lubricants urged inwardly.

12. The assembly of claim 11, wherein said first plurality of radial holes are arranged circumferentially at first and second longitudinal locations of said outer sleeve spaced apart from each other, and said second plurality of radial holes are arranged circumferentially at a longitudinal location between said first and second longitudinal locations.

* * * * *